Jan. 15, 1952 H. L. BARNEBEY ET AL 2,582,899
AUTOCLAVE REACTOR
Filed Dec. 14, 1946 4 Sheets-Sheet 1

INVENTORS
Herbert L. Barnebey
James R. Shields
By Christy, Parmelee & Strickland
attorneys Jan. 15, 1952  H. L. BARNEBEY ET AL  2,582,899
AUTOCLAVE REACTOR
Filed Dec. 14, 1946  4 Sheets-Sheet 3

INVENTORS
Herbert L. Barnebey
James R. Shields
By Christy, Parmelee & Strickland
attorneys Jan. 15, 1952  H. L. BARNEBEY ET AL  2,582,899
AUTOCLAVE REACTOR
Filed Dec. 14, 1946  4 Sheets-Sheet 4

INVENTORS
Herbert L. Barnebey
James R. Shields

Patented Jan. 15, 1952

2,582,899

UNITED STATES PATENT OFFICE 2,582,899

AUTOCLAVE REACTOR

Herbert L. Barnebey, Richland Township, Allegheny County, and James R. Shields, Pittsburgh, Pa., assignors to Blaw-Knox Company, Blawnox, Pa., a corporation of New Jersey Application December 14, 1946, Serial No. 716,412

2 Claims. (Cl. 23—290)

Our invention relates to the processing of fluids to effect certain reactions in which factors of time, temperature, agitation and pressure are important, and is for an apparatus and method for continuously effecting the reaction.

Typical operations which are now carried out as batch processes because of the difficulty of securing economically high yields by existing continuous operations, and to which this invention is applicable, are certain types of hydrolysis, polymerization, esterification, hydrogenation, etc.

In such typical processes the fluids to be processed, of which there may be one or more, including in some cases suspensions of solid particles in other fluids, are raised to the desired pressure, heated to reaction temperature, agitated and maintained at controlled temperature and pressure conditions for a definite period of time, followed by the removal of the product or products with the lowering of the pressure and temperature and frequently the separation of gaseous and liquid constituents. Our improved process and apparatus have especial utility in the treating of fats by heat and pressure to split the triglyceride into its fatty acid and glycerine components, and will be hereinafter specifically described in this connection.

In many such chemical processes, high pressure at the high temperature is useful to maintain one or more fluids in a liquid state, which because of its density permits the volumetric size of the vessels to be a minimum; and agitation serves to maintain a large interface area between mutually immiscible fluid reactants, or to disperse suspended solid reactants uniformly through a liquid mass, causing the reaction to be accelerated.

It is well known that in many reactions, the yields increase, and the reaction is further accelerated, as the temperature and pressure are raised. In some cases the reaction time may be reduced from periods conveniently measured in hours to periods necessarily measured in minutes or seconds. This acceleration renders the control of flow, mixing, thermal treatment, and detention time extremely critical. One of our objects is to make available for commercial applications the known advantages of high pressure treatment, and to bring about the utilization of pressures substantially higher than have heretofore been considered practicable.

Our apparatus provides sensitive control of the above mentioned factors adapted to achieve excellent results in continuous co-current treatment at high pressures though the time of processing be extremely short.

Our method relates to co-current processing particularly for fat splitting, and renders yields of co-current treatment for this purpose comparable to the results achieved by counter current treatment, yet simplifies the processing. It effects a large production from a small and relatively inexpensive plant. The fluids are maintained at high temperature in the liquid state, and are combined and agitated to produce a large interface area for a relatively brief and precisely controlled reaction time. The products are then separated under conditions of pressure and temperature which promote their concentration and purity.

In the use of our method and apparatus the fluid or fluids are introduced into and removed from a reactor at a controlled rate which maintains and varies according to pressure conditions in the system. The entering fluid is uniformly and quickly temperature conditioned or preheated before entering the reactor and in the reactor controlled temperatures are maintained while the fluid is agitated. Our reactor preferably embodies a series of communicating compartments in a common vessel, with agitating means in each compartment. Material is continuously supplied to one end compartment of the reactor and withdrawn from the compartment at the opposite end, the material progressing through each compartment in succession. Agitation and thermal treating of the fluid is thus effected, while the probability that any single portion or fraction will be over or under-treated is greatly reduced, and treatment of the material is rendered as uniform as possible. Thus by regulation of flow and pressure, uniform temperature conditioning, and multiple stage agitation, an efficient processing of the fluid continuously is provided. The outflow of the reactor is, as above indicated, controlled to provide the desired back pressure therein and rate of discharge therefrom, and the discharged fluid is reduced to a lower pressure, for example to atmospheric pressure, in a blow-down tank or receiver, which may also provide temperature regulation and, in many operations, "quench" or arrest the reaction at the desired point.

In the treatment of fats, as above suggested, the fat and feedwater, flowing at a predetermined rate and in the proper proportions, are separately preheated continuously with relatively small amounts undergoing heating at any given instant. This may be done by passing the two liquids through small diameter coils in a heat exchanger at a properly controlled rate of flow, so that while the volume at any given instant is small, the heating is uniform and occurs in a known or controlled time interval. The liquids are kept separate at this stage to avoid any reaction during preheating.

They are then discharged to combine together in the desired ratio into one end of the reactor under a temperature which may be about 450° F. and the critical temperature of water in the mixture, which is in the vicinity of 706° F., and at pressures somewhat above the vapor pressures of the liquid at these temperatures, as from about 420 lbs. per square inch to about 3200 lbs. per square inch. Improved results may be secured between the temperature range of about 500° F. and the critical temperature of water, and at pressures maintaining the fluids liquid; and a preferred temperature range is between about 600° F and about 706° F. The materials thus proceed together through a multiple compartment reactor as outlined above, the immiscible phases being dispersed by agitation to establish a large interface area in each compartment. The products from the reactor flow into a decanter where the temperature is reduced, partly by permitting escape of water vapor to a condenser at lower pressure which also effects a preliminary concentration of sweet water, and in this vessel the liquid products are detained to permit gravity separation. The fatty acid and concentrated sweet water are drawn off into separate blow-down tanks maintained at substantially atmospheric pressure, effecting final concentration of these liquids, and the water vapor flashing therefrom is condensed and preferably recycled to conserve any small amount of glycerine which it may contain. The degree of cooling which is effected in the decanter is influenced by such factors as avoiding solidification of the fatty acids on the one hand, and a fair concentration of sweet water and insolubility of the fatty acids therein on the other. It is preferred to cool the products in the decanter sufficiently to allow only a small amount of the dissolved fatty acids to remain in solution. Suitable temperatures for the decanter range between 300° F. and 500° F., not exceeding in any case, of course, the temperature of the reactor; and the temperatures between 450° F. and 480° F. are preferred, which generally is sufficient to prevent presence of dissolved fatty acids in sweet water exceeding 1%.

The entire apparatus for effecting the method can be compactly arranged and operates continuously, whereby the output for a relatively small amount of plant space and equipment is high.

Our invention may be more fully understood by reference to the accompanying drawings, in which.

Figure 1:
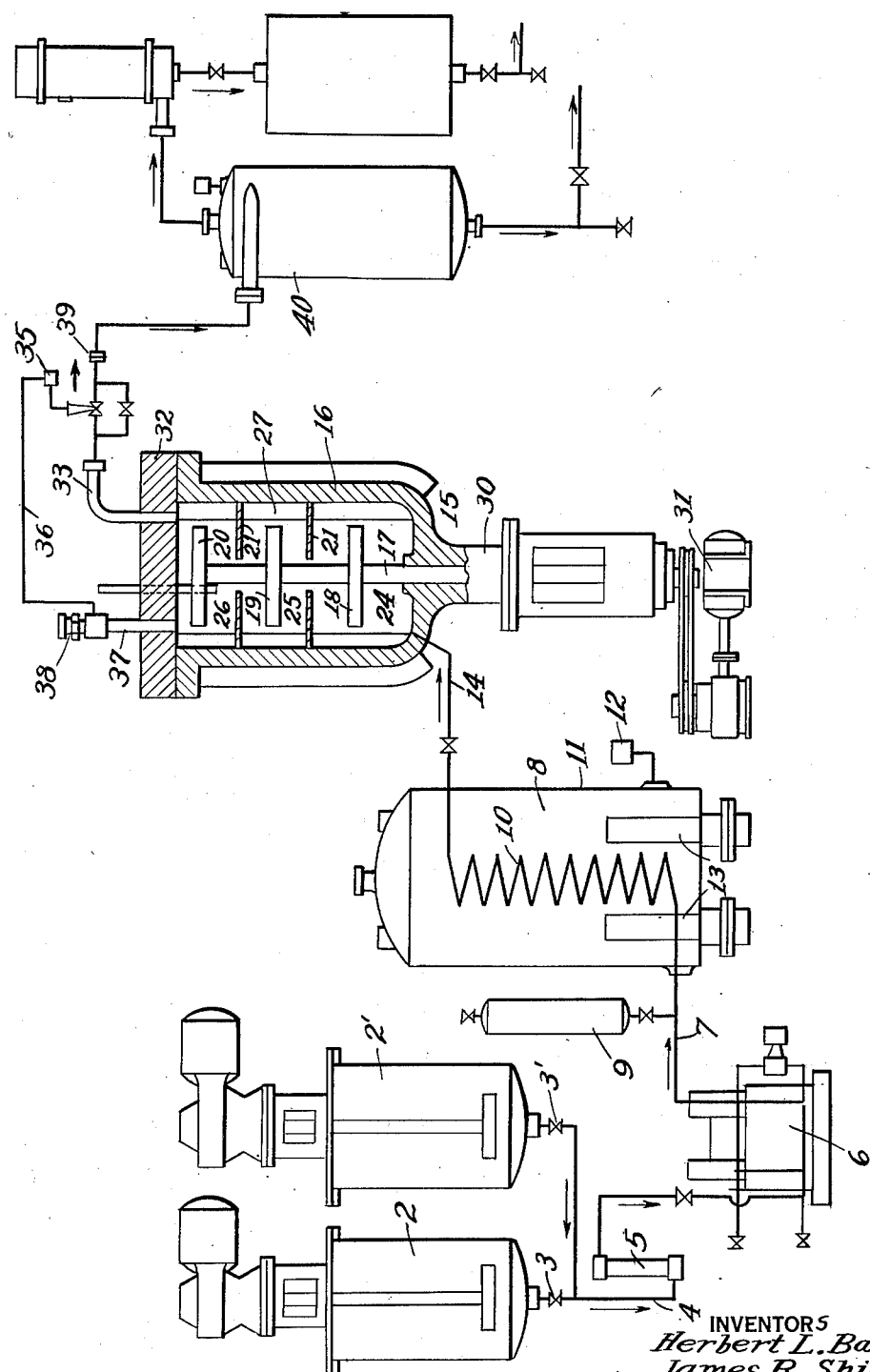
Fig. 1 is a schematic view of an apparatus constructed and operating in accordance with our invention.
Figure 2:
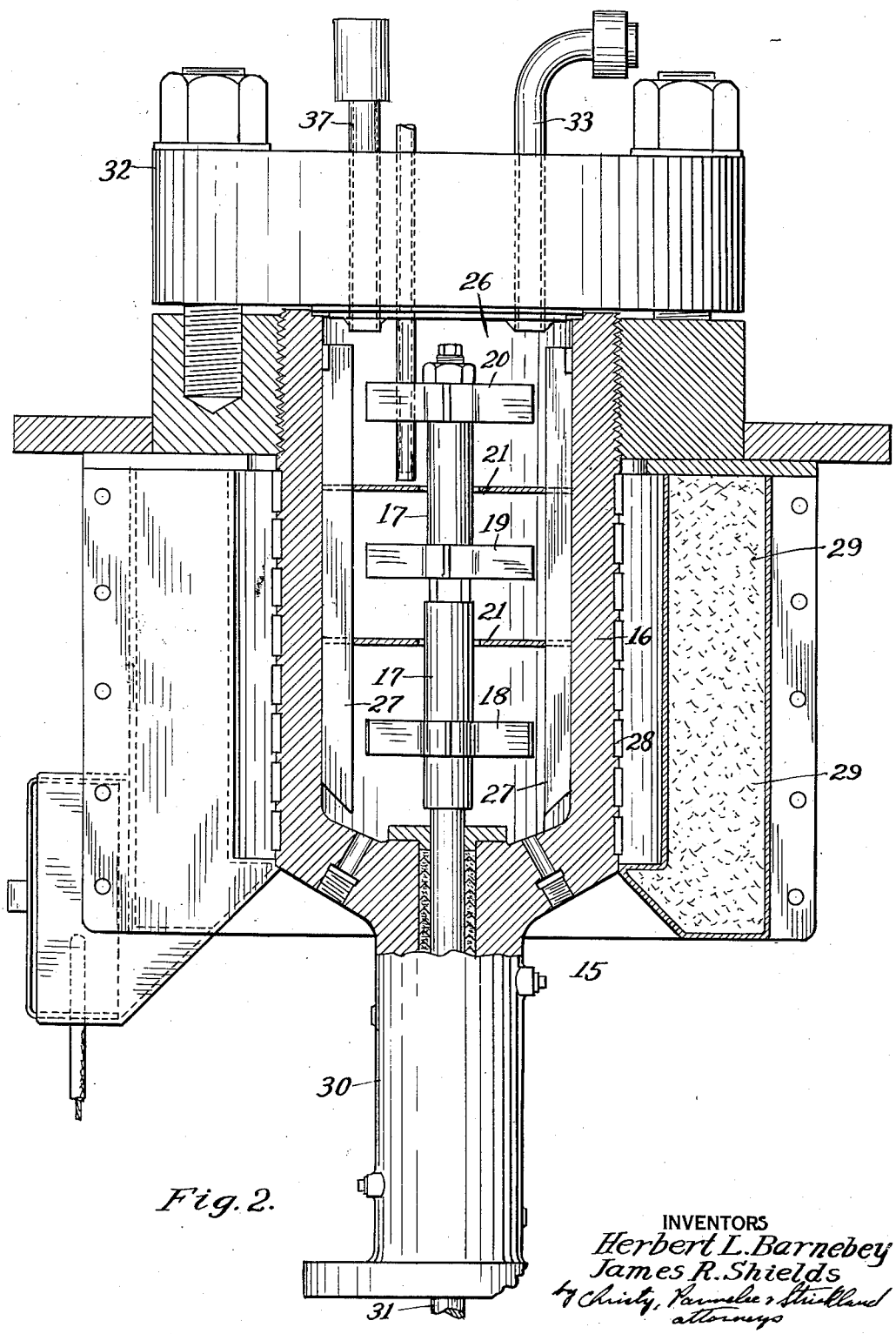
Fig. 2 is a vertical section through the reactor unit or autoclave, the top and bottom of the reactor, however, being shown in elevation.

Referring to the drawings, Fig. 1 illustrates one arrangement of our invention adapted for the treating of one or more fluids. For the purpose of simplification, the present description will be confined to the treatment of a single fluid, which may of course be a mixture of several substances, and may include divided solids in suspension.

In Fig. 1 there are shown two feed tanks 2 and 2' which may be alternatively used as the source of material to be treated in the continuous system. These tanks are illustrated as being equipped with motor-driven agitators. The feeding of the material to be treated is controlled valves 3 and 3' at the bottoms of the feed tanks. They deliver material into a pipe 4 in which there may be conveniently located a rotameter 5 which merely indicates the rate of flow of fluid through the pipe. The pipe is connected to the suction side of a feed pump 6. The feed pump illustrated is a two-cylinder proportioning pump, i. e., reciprocating pump having an adjustable stroke whereby the delivery rate can be changed when desired. The output of the pump flows through pipe 7 to a pre-heater 8. Between the pump and the pre-heater there is connected into the pipe 7 a flow cushion device 9, this flow cushion device comprising a tank in the lower portion of which is a quantity of the liquid being treated and in the upper portion of which is a volume of gas under pressure, the purpose of the flow cushion being to maintain an even pressure in the flow of liquid, notwithstanding the pulsating character of the discharge from the pump.

The pre-heater 8 may be of any known or preferred construction. Preferably it comprises a coil 10 of small diameter pipe with a considerable number of convolutions, so that the coil has a very substantial length. This coil is within a vessel 11 in which is retained a bath of heating liquid or vapor, the bath being maintained at a predetermined constant temperature. Conveniently the vessel 11 is generally cylindrical with a dome-shaped top, and is filled a little more than half full with a suitable heating liquid such as water or other fluids, preferably using a eutectic mixture of diphenyl and diphenyl oxide ("Dowtherm"), the space above this level containing vapor of this liquid. Immersion type electrical heaters enter the liquid bath from below, extending upwardly parallel to the axis of the coil 10, and they may be regulated by any suitable preferred temperature regulator indicated schematically at 12. The electrical heaters themselves are designated 13. These electrical heaters boil the "Dowtherm."

The long length of small diameter pipe is so proportioned that the material being pumped through it flows with considerable velocity, and is in the coil but a relatively short time. During this time, however, it contacts a large area of heating surface, so that when it is discharged into pipe 14, its temperature has been raised to a predetermined desired point approximating the temperature of the fluid in the pre-heater.

The pipe 14 delivers fluid into the bottom of the autoclave which is designated generally as 15, and which comprises a vessel 16 of sufficiently heavy structure to resist the pressures to which the fluid in the autoclave is subjected. Passing through one end (in this instance, the bottom) of the autoclave and extending into the interior thereof is an agitator shaft 17, and which has a plurality of agitating elements or impellers 18, 19 and 20 thereon. The interior of the vessel 16 is divided horizontally by partitions or diaphragms 21 into a vertical series of compartments or chambers. The diaphragms are illustrated, providing within the autoclave three compartments or chambers designated 24, 25 and 26. The impellers 18, 19 and 20 are located in the compartments 24, 25 and 26 respectively. Around the impeller shaft 17, each of the diaphragms 21 has an opening providing restricting communication around the shaft from one compartment to the next. This opening is restricted so that the materials passing from compartment to compartment at the rate of flow desired will have a considerable velocity.

There should be no less than there compartments in the autoclave, and there is no particular advantage in increasing the number of compartments above six, but the number of compartments may range between three and six, depending upon the nature of the process, the material being treated, and the size of the vessel.

The autoclave is provided with baffles extending upwardly along the sides of the interior of the vessel to retard or prevent the swirling of the contents, these baffles being designated 27. Around the exterior of the baffle 16 are electric resistance heaters in the form of bands 28 to supply additional heat, if necessary, for the particular reaction for which the autoclave is constructed. Around the heating elements is a jacket 29 filled with heat insulating material. It will be appreciated, of course, that in lieu of electric heating elements, hot liquid or vapor may be circulated around the exterior of the autoclave within the jacket 29 where lower temperatures are desired, or in lieu of the electrical heaters, and that, if the reaction in the autoclave is an exothermic reaction, the exterior of the autoclave might be cooled instead of heated.

The separation of the chamber within the autoclave into from three to six separate compartments having restricted communication with one another is important. Where treating times are short as provided in our high-pressure apparatus, greater precision in detention time control becomes paramount. Agitation and mixing also promote rapid reaction but generally cause (or at least do not hinder) unequal paths and velocities of various portions of the materials, and do not help insure against short circuiting of some portions of the material and overlong treatment of other portions. The construction described tends to correct these faults and to provide treatment of most of the materials for the desired length of time.

The impeller shaft which extends through the bottom of the autoclave or reactor passes through a bearing 30 through which lubricant under pressure is circulated, the temperature of the lubricant being regulated so as to also cool the bearing. Below the bearing is a driving mechanism designated generally as 31.

At the top of the reactor or autoclave there is a cover 32, and an outlet pipe 33 leads from the cover to a pressure controlling or regulating valve schematically illustrated at 34, and which is of any known or preferred construction. The regulating valve is controlled by a recording pressure controller schematically illustrated at 35, and which is responsive to the pressure within the autoclave, there being a pressure connection 36 from the controller to pipe 37 communicating with the interior of the autoclave, the pipe 37 being provided with a fitting 38 which receives a rupture disk or other safety relief element.

Beyond the pressure controlling or regulating valve 34 there may be connected in the pipe 33 an orifice plate 39, having a hole drilled there- through, the exact size of which may be experimentally determined in the field, so as to provide a uniform discharge from the autoclave. Beyond the orifice plate, pipe 33 discharges into blow-down tank 40 where separation of vapors and liquids may occur, the treated liquid being withdrawn from the bottom of the tank and the vapors flowing out of the top of the tank to be condensed or otherwise disposed of.

The orifice plate may be omitted if desired, but when it is used, the pressure regulating valve and the orifice plate are so proportioned that with the maximum pressure drop entirely across the orifice, that is, with the regulating valve wide open, the flow through the orifice will equal the flow delivered by the pump 6, when the autoclave pressure is only a small amount less than the desired autoclave pressure. The regulating valve is adjusted so as to always somewhat throttle the flow of fluid from the autoclave, and the back pressure on the orifice should always be a little less than the autoclave pressure, but the pressure drop would be maintained by means of the pressure valve substantially constant across the orifice so that the flow through the regulating valve and the orifice in series will be substantially uniform. In other words, the pressure regulating valve interposed between the autoclave and the orifice plate, compensates for such variations in pressure as may occur, and assures the out-flow from the autoclave being equal to the in-flow, whereby any predetermined pressure condition may be maintained in the autoclave. This may be in some cases effected by the regulating valve alone.

From the foregoing description, it will be seen that our invention provides a method and apparatus for the continuous treatment in a pressure vessel of one or more fluids with the probabilities being against any very substantial percentage of the material being in the treating chamber too short or too long a time. The presence of a separate agitator in each compartment insures thorough mixing and also eliminates the possibility of any straight line flow axially through the autoclave or reactor, and the presence of the baffles to prevent swirling avoids stratification that might otherwise occur due to the centrifugal action of the contents of the vessel whirling around inside the vessel.

Uniformity of treatment is also achieved by the process of preheating, wherein the fluid under treatment flows at high velocity through a long pipe of small diameter. Each portion of material entering the reactor has by this arrangement been preheated for exactly, or very nearly the same length of time as any other portion, so that inequalities due either to under-heating or over-heating are avoided.

By using a proportioning pump, the speed of circulation of the material through the system can be very accurately predetermined, and regulated, and the in-put adjusted to the capacity of the unit at the time of reaction and the pressure conditions.

Thus our method and apparatus provide for the continuous processing of liquids in a pressure vessel or like reactor, in which all conditions favor the material being acted on for the optimum period of time under the optimum conditions of pressure and temperature. They further provide means for treating large quantities of materials by continuous co-current flow at high temperatures in a space of small volume, by maintaining the reactants at liquid densities and keeping immiscible phases effectively dispersed to produce a large interface area during the optimum period of time, although that time be a very short one.

The blow-down vessel 40 into which the treated material is driven, and which may, if desired, be provided with cooling coils or other temperature regulating means, may in many operations also serve as a quenching tank or vessel to arrest the reaction at the desired point. For example in processes involving the polymerization of fluid under predetermined conditions of heat and pressure, the release of pressure upon discharge of the material through the orifice plate and its expansion in the quench tank, coupled in some cases with cooling, will arrest the polymerization at the desired point.

Figure 3:
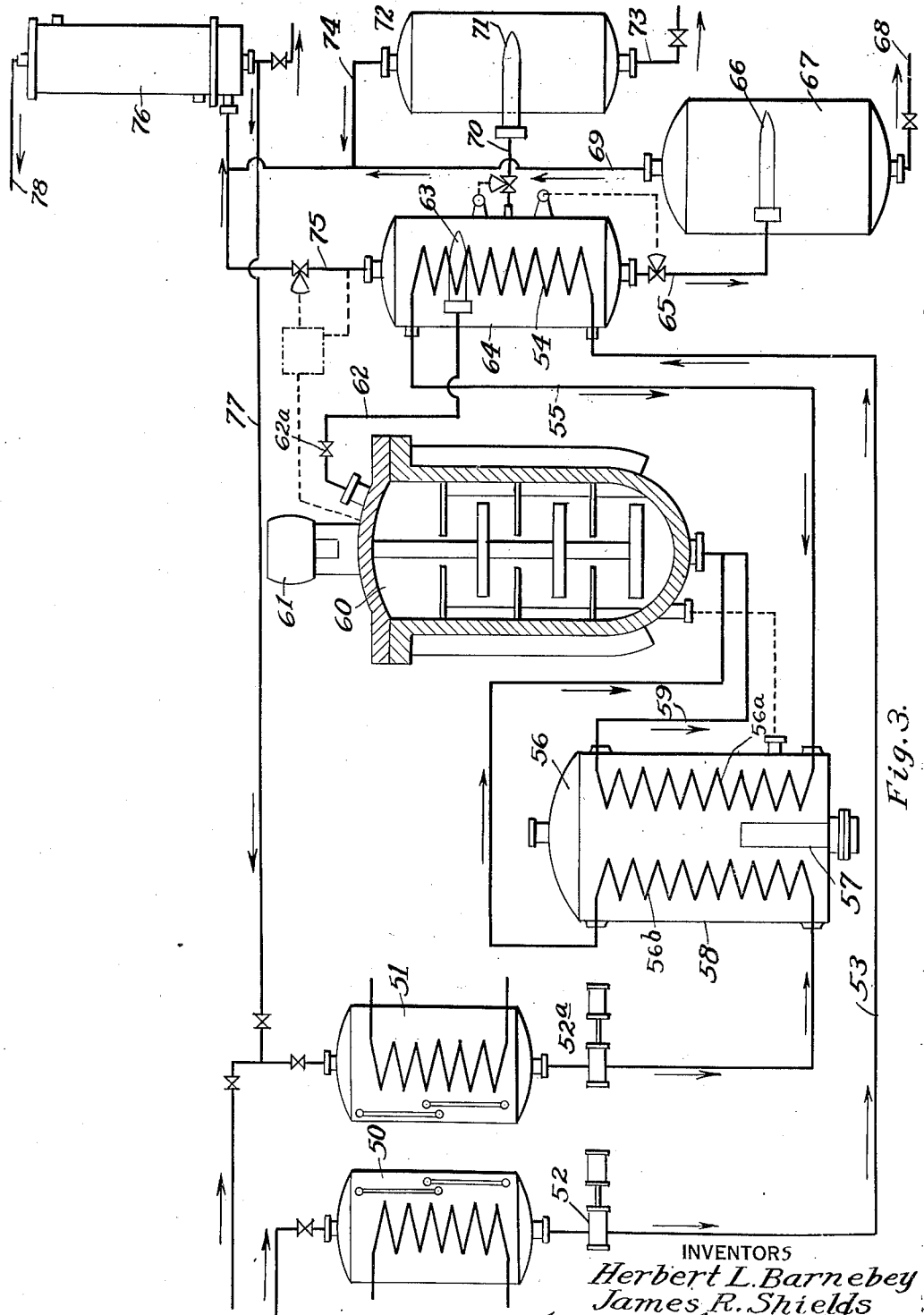
Fig. 3 is a schematic view similar to Fig. 1, showing an apparatus specifically for the treatment of fats.
Figure 4:
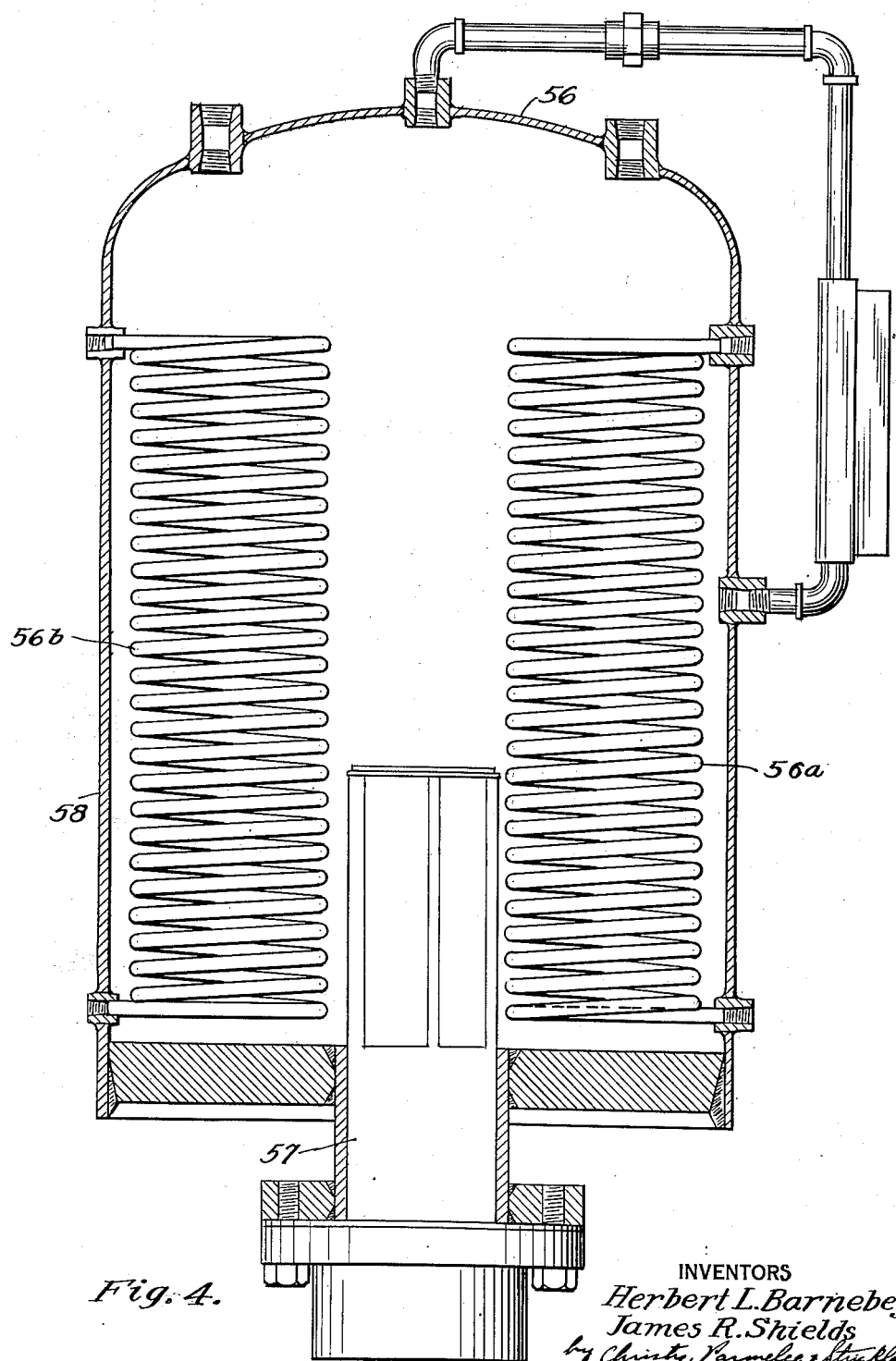
Fig. 4 is a vertical section through the fluid preheater.

For one specific application of the foregoing invention to the process of fat splitting, reference may be had to Figs. 3 and 4, in which there are two vessels 50 and 51 which may be provided with heaters as indicated to raise the temperature of the fluid therein to a point above room temperature, but below the reaction temperature. Tank 50 contains fat substance which is of course in the nature of a triglyceride, while the tank 51 may be for water. At the bottom of the tank 50 there is an outlet pipe which delivers to a proportioning or other pump 52 that gives a controlled regulated output. The liquid fat discharged from the pump 52 is forced through pipe 53 into a pre-heating coil 54 located in the decanter to be hereafter more fully described, whereby it is warmed in heat exchange relation with the hot fluids in the decanter. From the discharge end of this coil is a pipe 55 that leads into the final preheating coil 56a in a heater 56, which is shown in detail in Fig. 4, and which corresponds generally to the heater 8 hereinbefore described, and is comprised of an immersion type electric heater 57 in a vessel 58 filled partially with high boiling point liquid, and partially with the vapor of such liquid. The coil 56a is a long length of small diameter pipe. Because of the small diameter the total volumetric capacity of the heating coil is small so that the fat substance does not remain too long in this coil and the flow is continuous, but because of the great length there is adequate heat exchange surface to bring the fat up to the desired temperature. From the discharge end of the heating coil 56a the fat is discharged through pipe 59 into the bottom of the agitating multiple chamber autoclave 60 which is generally similar to that previously described, and which need not be again described in detail, except to state that in this particular unit the motor for driving the agitator is indicated as being located at the top of the structure at 61.

Water is similarly delivered under pressure preheated to proper temperature by pump 52a through a coil 56b in the preheater 56 and connecting piping as shown. Separate preheating coils for fat and water are preferred both in order to avoid any fat-splitting in the preheater, the parts of which may then be constructed of ordinary steel, special corrosion resisting materials not then being necessary.

The reacted fluids are discharged from the top of the autoclave through pipe 62, which terminates in a nozzle 63 opening into the decanter 64. The decanter 64 has an outlet pipe 65 at the bottom which discharges through nozzle 66 into the sweet-water blow-down tank 67, which tank in turn has a discharge pipe 68 at the bottom and has a vapor off-take pipe 69 at the top.

At an intermediate position between the top and the bottom of the decanter is a second outlet pipe 70 which introduces the fatty acids from the decanter through nozzle 71 into the fatty acid blow-down tank 72. This fatty acid blow-down tank also has a drain pipe 73 at the bottom thereof, and a vapor off-take pipe 74 that connects into the vapor outlet pipe 69 from the first blow-down tank.

The decanter has a vapor outlet pipe 75 at the top thereof into which the pipe 69 also connects, so that vapors from all three vessels may be delivered to a condenser 76. The condenser 76 has a condensate discharge pipe 77 which leads back to the tank 50 so that condensed water and other vapors may be recycled. The condenser may have a vent 78 for the uncondensable gases.

Manual or automatic valves may be used to control the flow of fluids from the decanter, arrangements known to the art and schematically illustrated being indicated so as to maintain the pressure in the decanter at a predetermined point below the pressure in the autoclave.

For the splitting of fatty substances, the water and fat are delivered by the pumps at pressures sufficient to maintain them liquid, heated to a temperature of the order previously mentioned, and delivered to the autoclave or reactor.

In the autoclave under the conditions of heat, pressure and agitation, and in the presence of water, the fat is split into fatty acid and glycerine, which is discharged through the decanter. Because of the sensible heat of these products in the decanter, a substantial amount of the water evaporates and escapes at a controlled rate through valve 75 to be condensed and re-cycled as described, while gravity separation of the fatty acids and the glycerine solution takes place, the fatty acid rising to the top of the glycerine solution. Some of the heat of the fluids in the decanter is effectively utilized in the heat exchange coil 54 for preheating the fat before it goes to the heating coil 56a. By these means of evaporation and heat exchange, the contents of the decanter are brought to a desired lower temperature of the order previously mentioned, the sweet-water substantially increased in concentration, and the solubility of fatty acids therein substantially reduced. The sweet-water being withdrawn from the bottom of the decanter into the blow-down tank 67 is still at the approximate temperature in the decanter. Low pressure is maintained in the blow-down tank, the water which is carried with it is flashed into steam and escapes through pipe 69 while the liquid glycerine collects in the bottom from which it is withdrawn. Likewise the level of the outlet pipe 70 is such that fatty acids are discharged through it into the blow-down tank 72 where the water is flashed into vapor, and the fatty acid remains liquid. By condensing and re-cycling the water vapor, a certain amount of unreacted or recoverable materials are also condensed, and re-cycled, so as to avoid waste, and also some of the heat is conserved. As illustrated, provision is made for introducing fresh water from time to time as it may be needed into the top of the tank 51, and means may be provided at the discharge end of the condenser for drawing off condensate which is not to be re-cycled.

It should be mentioned that the water, as is the fat, is forced through the system by a proportioning or other pump 52a, giving a controlled regular output, and the output of the pumps 52 and 52a is adjusted to the desired ratio. This arrangement is substantially the same as the one shown in Fig. 1, in which the two pumps are combined in a single unit.

While we have illustrated and described certain preferred embodiments of our invention, it will be understood that this is by way of illustration, and that various changes and modifications may be made therein within the contemplation of our invention and under the scope of the following claims.

We claim:

1. A continuous reactor for subjecting fluid material to treatment under heat and pressure comprising a vessel with an elongated generally cylindrical chamber therein, an agitator shaft extending coaxially through the chamber, the shaft extending outside the chamber and being provided with means for driving the same, a plurality of transverse partitions in the chamber open at their centers around the agitating shaft dividing the chamber into a lineal series of compartments in open communication with one another, a turbine type agitator on the shaft in each of the several compartments and located about midway between the partitions having radial paddle-like vanes thereon, and vertical baffles in each of the compartments projecting radially toward the center to prevent swirling of the fluids being agitated designed to produce in each compartment upon rotation of the agitator a cyclical flow of fluid from the periphery of the agitator to the peripheral wall of the chamber, thence lengthwise of the chamber in each direction along the walls of the compartment, and thence radially inwardly adjacent said partitions toward the shaft, means for introducing a fluid material into the endmost compartment at one end of the chamber and means for removing a reacted fluid from the endmost compartment at the opposite end of the chamber.

2. An autoclave having a chamber therein, a shaft extending axially of the chamber, a plurality of agitators paddle like on the shaft at spaced intervals therealong having radially extending vanes, transverse partitions in the chamber staggered about midway between the agitators, whereby the chamber is divided into a series of compartments each having an agitator therein in the region of the middle of the compartment only, the agitator being substantially shorter than the compartment in which it is located, the partitions each having a central opening of larger diameter than the shaft through which the shaft extends and through which continuously open communication from one compartment to another is maintained, means for introducing fluid material to be processed into one end of the chamber and means for removing it from the other end of the chamber, and means coextensive with the length of each compartment on the peripheral wall of each compartment to restrain the fluid material from swirling in order to create in each compartment an eddying flow from the periphery of the agitator to the peripheral walls of the chamber, thence back to the shaft adjacent the diaphragms.

HERBERT L. BARNEBEY.
JAMES R. SHIELDS.

REFERENCES CITED

The following references are of record in the file of this patent:

UNITED STATES PATENTS

| Number | Name | Date |
|---|---|---|
| 1,196,597 | Sheppard | Aug. 29, 1916 |
| 2,005,447 | Warster | June 18, 1935 |
| 2,053,876 | Pfau | Sept. 8, 1936 |
| 2,126,539 | Dickinson | Aug. 9, 1938 |
| 2,150,733 | Thurman | Mar. 14, 1939 |
| 2,154,835 | Eisenlohr | Apr. 18, 1939 |
| 2,221,799 | Ittner | Nov. 19, 1940 |
| 2,367,666 | Carleton | Jan. 23, 1945 |

OTHER REFERENCES

Ser. No. 255,603, Rastelli (A. P. C.), published June 23, 1943.